(12) United States Patent
Nishiyama

(10) Patent No.: US 6,391,963 B1
(45) Date of Patent: May 21, 2002

(54) RUBBER COMPOSITION AND A FUEL TRANSPORTING HOSE FOR A VEHICLE

(75) Inventor: Takahiro Nishiyama, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/831,903

(22) PCT Filed: Nov. 7, 2000

(86) PCT No.: PCT/JP00/07820

§ 371 Date: May 25, 2001

§ 102(e) Date: May 25, 2001

(87) PCT Pub. No.: WO01/34697

PCT Pub. Date: May 17, 2001

(51) Int. Cl.$^7$ ................................................. B32B 1/08
(52) U.S. Cl. ..................... 524/565; 428/36.8; 428/39.9; 428/492; 428/522; 138/137; 138/140
(58) Field of Search ........................... 524/565; 138/137, 138/140; 428/36.8, 39.9, 492, 522

(56) References Cited

U.S. PATENT DOCUMENTS 4,657,285 A * 4/1987 Akiyama et al. ............ 286/256
5,356,681 A * 10/1994 Ichikawa et al. ........... 428/36.8
5,910,544 A * 6/1999 Ozawa et al. ................ 525/178

* cited by examiner

*Primary Examiner*—Kriellion A. Sanders
(74) *Attorney, Agent, or Firm*—Jacobson Holman, PLLC

(57) ABSTRACT

A plasticizer having a specific SP value and a specific molecular weight is added to NBR having a specific AN content in an ultrahigh range, or a blend of such NBR and less than 25 percent by weight of PVC so that a good balance may be obtained between its amount and the AN content of the NBR. A fuel hose for a vehicle having an inner wall layer formed from such a rubber composition and an outer wall layer formed from a rubber material having ozone resistance or cure flatting resistance is provided. The rubber composition is of good fuel impermeability and low temperature properties and also has a high conductivity. The hose is of good fuel impermeability and low temperature properties and also has a high conductivity.

15 Claims, No Drawings

RUBBER COMPOSITION AND A FUEL TRANSPORTING HOSE FOR A VEHICLE

TECHNICAL FIELD

This invention relates to a rubber composition and a fuel transporting hose for a vehicle. More particularly, this invention relates to a fuel transporting hose for a vehicle which is simple and inexpensive in construction and is satisfactory for fuel impermeability and a certain level of conductivity as required of a fuel transporting hose for a vehicle, and to a rubber composition used therefor.

BACKGROUND ART

Regulations concerning the permeation of fuel in a vehicle, which are similar to the so-called SHED regulation in the United States, are put into effect in A.D. 2000 in Japan and Europe. As is well known, a fuel transporting hose is highly responsible for the permeation of fuel in a vehicle, and measures have been sought for controlling the permeation of fuel from a fuel transporting hose.

It has been a common practice in Japan to use FKM (fluororubber) of high fuel impermeability and sour resistance to form an inner wall layer of a fuel hose used in what is called a liquid line, such as a feed or return circuit in a vehicle fuel line. Generally used NBR (acrylonitrile-butadiene rubber), or NBR-PVC which is a blend of NBR and PVC (polyvinyl chloride), has been used for a filler neck hose connecting a filler hole and a gasoline tank, or a breather or evaporation hose forming a vapor line. In the United States having the SHED regulation already in effect, the specifications for a filler neck hose or an evaporation hose employ FKM or a resinous material such as a polyamide resin or fluororesin for its inner wall layer and NBR-PVC, ECO (epichlorohydrin rubber), CSM (chlorosulfonated polyethylene rubber) or the like for its outer wall layer.

The specifications adopted in Japan for the filler neck, breather and evaporation hoses as mentioned above, however, fail to attain any fuel impermeability conforming to the national regulation going to be put into effect as stated above. The filler neck or evaporation hose having an inner wall layer formed from FKM or a resinous material as in the United States can be expected to satisfy the regulation in fuel impermeability. FKM or a fluororesin is, however, expensive, and is so low in reactivity that its bonding to an outer layer material requires an additional level of technical skill and an additional amount of processing cost. Another drawback is that a complicated manufacturing process is required for shaping a hose having a layer of FKM like bellows.

It has also been pointed out that a filler neck or breather hose may be charged with static electricity as a result of e.g. the flow of gasoline during fill-up or body vibration and may produce a spark when contacted by a metallic fill-up gun, resulting in the ignition of gasoline. It is, thus, hoped that conductivity will be imparted to any such hose (for example, to the extent giving it a volume specific resistance not exceeding $10^8 \Omega \cdot cm$) to prevent any electrical charging thereof. It is, however, difficult to impart any satisfactory conductivity, since FKM or a resinous material essentially has a high electric resistance.

Under these circumstances, it is an object of this invention to make a fuel transporting hose for a vehicle having high fuel impermeability and conductivity by using a simple and inexpensive rubber composition. The inventor of this invention has evaluated various rubber compositions containing NBR or NBR-PVC as a base material, and has conceived a compound design for a rubber composition which is comparable to FKM in fuel impermeability and exhibits high conductivity, while ensuring the necessary properties including low temperature properties.

DISCLOSURE OF THE INVENTION

It has been pointed out that NBR or NBR-PVC having a relatively high AN content of, say, 36 to 42 percent by weight has an improved fuel swelling resistance. However, the inventor's experiment conducted by using PHASE 11 gasoline for evaluation (gasoline for a permeation test as specified by the U.S. CARB, i.e. SHED test) indicates that NBR or NBR-PVC having such an content is apparently unsatisfactory in fuel impermeability.

During the process of research work, on the other hand, the inventor has found that NBR or NBR-PVC having a specific AN content in an ultrahigh nitrite range (for example, 43 percent by weight or higher) has a high fuel impermeability comparable to that of FKM. The inventor has also found that, while it is feared that NBR or NBR-PVC having an content in an ultrahigh nitrite range may be undesirably poor in low temperature properties as required of a fuel hose for a vehicle (the flexibility of a hose used in a very cold place having a temperature of as low as, say, −30° C.), the addition of a properly selected plasticizer in a properly selected amount makes it possible to realize a satisfactory level of low temperature properties while ensuring a high fuel impermeability, and that the proper addition of carbon black (CB) makes it possible to realize satisfactory conductivity while ensuring the properties mentioned above.

Moreover, the inventor has found very interesting matters, as shown at (1) to (4) below, about the technical meaning of PVC as a material blended for such a rubber composition.

(1) PVC is basically a component contributing to fuel impermeability, and it is necessary or beneficial to blend PVC with NBR to impart weatherability and ozone resistance to a rubber composition used for making an outer layer for a fuel hose having a multilayer wall structure, or a fuel hose having a single-layer wall. A rubber composition containing 25 percent by weight or more of PVC relative to NBR is practically satisfactory in weatherability and ozone resistance.

(2) It is, therefore, not necessary to blend 25 percent by weight or more of PVC with NBR to make any rubber composition not used for the purpose as stated at (1) above. On the other hand, it is feared that PVC as a resinous component may lower the low temperature properties of the composition. While it is effective in this connection to increase the proportion of the plasticizer, the excessive increase of the plasticizer in the rubber composition results in a reduction of its fuel impermeability. Thus, an increase in the blend ratio of PVC brings about a narrowing in the range of proportions which can be selected for achieving a good balance between the fuel impermeability of the rubber composition and its low temperature properties.

(3) If the amount of PVC blended is less than 25 percent by weight relative to NBR, it is possible to secure a broad range of proportions which can be selected for making a rubber composition having a good balance between fuel impermeability and low temperature properties, while maintaining the contribution of PVC to fuel impermeability as stated above. The amount of PVC is preferably not more than 5 percent by weight if the balance between the fuel impermeability of the rubber composition and its low temperature properties is more important than the contribution of PVC to its fuel impermeability.

(4) If NBR has an content set in a really ultrahigh range not lower than 46 percent by weight, the contribution of PVC to fuel impermeability as stated above can hardly be obtained. In such a case, therefore, it is preferable in view of the foregoing (1) to (3) to use NBR as a base material without blending any PVC.

According to a first aspect of this invention, there is, thus, provided a rubber composition for a fuel transporting hose for a vehicle which comprises NBR having an AN (combined acrylonitrile) content of 46 to 52 percent by weight as a base material, and 15 to 30 parts by weight of a plasticizer having an SP value (solubility parameter) of 8.8 or more and a molecular weight of 550 or less, relative to 100 parts by weight of the base material.

According to the first aspect of this invention in which NBR having an AN content of 46 to 52 percent by weight is used as a base material, NBR having such an ultrahigh AN content makes it possible to obtain a high fuel impermeability comparable to that of FKM. The composition contains 15 to 30 parts by weight of a plasticizer having the SP value and molecular weight stated above relative to 100 parts by weight of the base material. The plasticizer having a molecular weight of 550 or less is low in viscosity at a low temperature and markedly improves the low temperature properties of the rubber composition. The plasticizer having an SP value of 8.8 or more is well miscible with NBR or NBR-PVC having the AN content stated above and does not substantially affect the fuel impermeability of the rubber composition. Therefore, the rubber composition exhibits both a high level of fuel impermeability and a satisfactory level of low temperature properties. Moreover, the proper addition of carbon black (CB) makes it possible to realize a satisfactory level of conductivity, while ensuring the various properties as stated above. If the plasticizer has an SP value of less than 8.8, its deficiency in solubility with the base material causes its bleeding and it may fail to contribute effectively to improving the low temperature properties of the rubber composition. If the plasticizer has a molecular weight exceeding 550, its deficiency in viscosity at a low temperature may fail to contribute effectively to improving the low temperature properties of the rubber composition. If the plasticizer has a proportion of less than 15 parts by weight, its addition may not prove to be satisfactory, and if its proportion exceeds 30 parts by weight, it is feared that it may adversely affect the fuel impermeability of the rubber composition and may bleed from the base material. The rubber composition according to the first aspect of this invention is unsuitable as a material for an outer wall layer of a fuel hose having a multilayer wall structure, or for a fuel hose having a single-layer wall, since it does not have any PVC blended with NBR.

According to a second aspect of this invention, there is provided a rubber composition for a fuel transporting hose for a vehicle which comprises a blended base material obtained by blending NBR having an AN content of 46 to 52 percent by weight and PVC in an amount of less than 25 percent by weight relative to NBR, and 15 to 30 parts by weight of a plasticizer having an SP value of 8.8 or more and a molecular weight of 550 or less, relative to 100 parts by weight of the base material.

According to the second aspect of this invention which employs a blended base material obtained by blending NBR having an AN content of 46 to 52 percent by weight and less than 25 percent by weight of PVC, the action of NBR having an ultrahigh AN content and a certain contribution of PVC to fuel impermeability make it possible to achieve a high level of fuel impermeability which is comparable to that of FKM. The composition also contains the same amount of the same plasticizer as in the first aspect of this invention. Therefore, it is possible to obtain various operations and efffects from the addition of a proper amount of a plasticizer having a proper SP value and molecular weight, as is the case with the first aspect of this invention. The effects by the proper addition of carbon black (CB) can also be obtained. The rubber composition according to the second aspect of this invention is unsuitable as a material for an outer wall layer of a fuel hose having a multilayer wall structure, or for a fuel hose having a single-layer wall, since it has a PVC proportion of only less than 25 percent by weight relative to NBR. As its proportion is less than 25 percent by weight, PVC does not appreciably affect a good balance between the fuel impermeability of the rubber composition and its low temperature properties.

According to a third aspect of this invention, the rubber composition according to the first or second aspect thereof satisfies one or more of the following (1) to (4):

(1) NBR has an AN content of 48 to 52 percent by weight;
(2) the plasticizer has an SP value of 9.0 or more;
(3) the plasticizer has a molecular weight of 450 or less; and
(4) the plasticizer has a proportion of 20 to 25 parts by weight relative to 100 parts by weight of the base material.

The rubber composition satisfying one or more of the foregoing (1) to (4) is a particularly good rubber composition.

According to a fourth aspect of this invention, the rubber composition according to any of the first to third aspects thereof satisfies the following (5) and/or (6):

(5) it has a volume specific resistance not exceeding $10^8 \Omega \cdot cm$; and
(6) it has a hardness of 55 to 75 degrees as measured by a JIS K6253 (ISO 48) durometer, type A.

The good conductivity of the rubber composition containing a proper amount of a proper type of CB and thereby satisfying the foregoing (5) makes it possible to prevent effectively any inconvenience caused by an electrostatic charge, including sparking during fill-up, as mentioned before. The rubber composition having a hardness satisfying the foregoing (6) as measured by a JIS K6253 (ISO 48) durometer, type A, owing to the proper addition of plasticizer and CB can make a fuel hose for a vehicle having a practically suitable level of hardness or softness.

According to a fifth aspect of this invention, there is provided a fuel transporting hose for a vehicle having an inner wall layer formed from a rubber composition according to any of the first to fourth aspects of this invention and an outer wall layer formed from a rubber material of high weatherability and ozone resistance, and further including a reinforcing yarn layer formed between the inner and outer wall layers, if required.

The rubber composition according to any of the first to fourth aspects of this invention is low in weatherability and ozone resistance, since its base material is NBR not blended with PVC, or NBR blended with only less than 25 percent by weight of PVC, though it has a good balance between fuel impermeability and low temperature properties and good conductivity. The construction of the fuel transporting hose for a vehicle according to the fifth aspect of this invention ensures its high weatherability and ozone resistance, while it retains the advantages of the rubber composition, such as its fuel impermeability and good conductivity. The reinforcing yarn layer between the inner and outer wall layers ensures an improved hose strength as an additional advantage.

According to a sixth aspect of this invention, there is provided a fuel transporting hose for a vehicle having an inner wall layer formed from a rubber composition as set forth at (7) below and an outer wall layer formed from a rubber composition as set forth at (8) below, and further including a reinforcing yarn layer formed between the inner and outer wall layers, if required:

(7) a rubber composition comprising: as a base material NBR having an AN content of 48 to 52 percent by weight, or such NBR blended with less than 5 percent by weight of PVC; and 15 to 25 parts by weight of a plasticizer having an SP value of 8.8 or more and a molecular weight of 550 or less, relative to 100 parts by weight of the base material; and (8) a rubber composition comprising: as a base material a blend of NBR having an AN content of 43 to 50 percent by weight and 25 to 40 percent by weight of PVC; and 15 to 35 parts by weight of a plasticizer having an SP value of 8.8 or more and a molecular weight of 550 or less, relative to 100 parts by weight of the base material.

The rubber composition (7) for the inner wall layer of the hose according to the sixth aspect of this invention contains as its base material NBR having an AN content shifted to the ultrahigh side as compared with the rubber composition according to the first aspect of this invention, or NBR-PVC containing a very small amount of PVC as compared with the rubber composition according to the second aspect of this invention, and further contains a similar amount of a similar plasticizer. Therefore, the rubber composition has a particularly good balance between its fuel impermeability and low temperature properties, and as there is no substantial meaning in blending PVC with NBR having an ultrahigh AN content of 48 to 52 percent by weight, the rubber composition hardly has its fuel impermeability affected, even if the amount of PVC is less than 5 percent by weight, or even zero. The rubber composition (8) for the outer wall layer is of satisfactorily high weatherability and ozone resistance, while having certain levels of fuel impermeability and low temperature properties at the same time, as stated at (1) before. Thus, the hose according to the sixth aspect of this invention is comparable or even superior in fuel impermeability to that according to the fifth aspect thereof, can realize good conductivity, and can also realize low temperature properties as required. The reinforcing yarn layer further formed between the inner and outer wall layers brings about an improved hose strength as an additional advantage to the fuel transporting hose according to the sixth aspect of the invention.

According to a seventh aspect of the invention, there is provided a fuel transporting hose for a vehicle in which the rubber composition (7) according to the sixth aspect of this invention satisfies one or more of the following (9) to (12) and/or the rubber composition (8) according to the sixth aspect of this invention satisfies one or both of the following (10) and (11):

(9) NBR has an AN content of 50 to 52 percent by weight;
(10) the plasticizer has an SP value of 9.0 or more;
(11) the plasticizer has a molecular weight of 450 or less; and
(12) the plasticizer is added in an amount of 18 to 23 parts by weight relative to 100 parts by weight of the base material.

According to the seventh aspect of this invention, it is possible to realize a particularly good rubber composition if the rubber composition (7) according to the sixth aspect of this invention satisfies one or more of (9) to (12).

According to an eighth aspect of this invention, there is provided a fuel transporting hose for a vehicle in which the rubber composition (7) and/or (8) according to the sixth or seventh aspect of this invention satisfies the following (13) and/or (14):

(13) the rubber composition has a volume specific resistance not exceeding $10^8 \Omega \cdot cm$; and
(14) it has a hardness of 55 to 75 degrees as measured by a JIS K6253 (ISO 48) durometer, type A.

According to the eighth aspect of this invention, the good conductivity of the rubber composition (7) and/or (8) containing a proper amount of a proper type of CB and thereby having its volume specific resistance adjusted as stated at (13) makes it possible to prevent effectively any inconvenience caused by an electrostatic charge, including sparking during fill-up, as mentioned before. The rubber composition having its hardness adjusted as stated at (14) owing to the proper addition of plasticizer and CB can make a fuel hose for a vehicle having a practically suitable level of hardness or softness.

According to a ninth aspect of this invention, there is provided a fuel transporting hose for a vehicle having an inner wall layer formed from the rubber composition (7) according to any of the sixth to eighth aspects of this invention and an outer wall layer formed from a rubber material of high weatherability, ozone resistance and cure flatting (flatting during curing) resistance, and further including a reinforcing yarn layer formed between the inner and outer wall layers, if required.

The rubber composition (7) according to any of the sixth to eighth aspects of this invention tends to lack flatting resistance during cure under heat, since its base material is NBR having an ultrahigh AN content, or NBR blended with only less than 25 percent by weight of PVC, though it has a good balance between fuel impermeability and low temperature properties and good conductivity. The construction of the hose according to the ninth aspect of this invention ensures its high weatherability, ozone resistance and cure flatting resistance, while it retains the advantages of the rubber composition, such as its fuel impermeability, low temperature properties and conductivity. As one of its specific advantages, its pan cure with no mandrel can be carried out without any problem, even if the hose may be of a relatively large diameter like a breather hose. The reinforcing yarn layer further formed between the inner and outer wall layers ensures an improved hose strength as an additional advantage to the fuel transporting hose according to the ninth aspect of the invention.

MODES OF CARRYING OUT THE INVENTION

Rubber Compositions:

The rubber compositions according to this invention are roughly classified into the rubber composition according to the first aspect, the rubber composition according to the second aspect, the rubber composition (7) according to the sixth aspect and the rubber composition (8) according to the sixth aspect. Modes of putting these rubber compositions into practice will now be described below.

1. Rubber Composition According to the First Aspect:

The rubber composition according to the first aspect of this invention is a rubber composition used for a fuel transporting hose for a vehicle, comprising NBR having an AN content of 46 to 52 percent by weight as a base material and 15 to 30 parts by weight of a plasticizer having an SP value of 8.8 or more and a molecular weight of 550 or less, relative to 100 parts by weight of the base material. Because of its low weatherability and ozone resistance as stated before, it is unsuitable as a material for an outer wall layer of a fuel hose having a multilayer wall structure, or as a material for a fuel hose having a single-layer wall, and is suitable for use as a material for an inner wall layer of a fuel hose having a multilayer wall structure.

The rubber composition has a particularly good fuel impermeability if its NBR has an AN content of 48 to 52 percent. A plasticizer having an SP value of 9.0 or more is particularly well miscible with NBR to effect a great improvement in the low temperature properties of the rubber composition and is particularly unlikely to lower its fuel impermeability. A plasticizer having a molecular weight of 450 or less is remarkably low in viscosity at a low temperature and remarkably improves the low temperature properties of the rubber composition. The addition of the plasticizer produces the best-balanced result if its amount is 20 to 25 parts by weight relative to 100 parts by weight of NBR.

An ether-ester type plasticizer, such as ADEKA CIZER RS-107 or RS-540 (tradename) of Asahi Denka Kogyo K.K., can be mentioned as a preferred plasticizer, though any other type of plasticizer can also be used if it satisfies the conditions as stated above.

The rubber composition preferably has a volume specific resistance not exceeding $10^8 \Omega \cdot cm$ by the proper addition of CB and/or a hardness of 55 to 75 degrees (as measured by a JIS K6253 (ISO 48) durometer, type A) by the well-balanced addition of plasticizer and CB. The amount of CB to be added may, for example, be about 20 to 100 parts by weight relative to 100 parts by weight of NBR, though it cannot be expressed by a definite value, since it varies with the amount of the plasticizer, the kind of CB, etc. While any kind of CB can be used, it is preferable to use CB having a relatively small particle diameter and a large structure and contributing greatly to conductivity and it is possible to use with or instead of such CB conductive carbon, such as acetylene black or Ketchen Black. It is also possible to use any conductivity agent other than CB if it does not affect impermeability adversely.

The rubber composition according to the first aspect of this invention may further contain various kinds of other known additives, such as a vulcanizing agent, a vulcanization accelerator, a white reinforcing agent and an antioxidant agent. As a vulcanizing agent, it is preferable to use one which is commonly used for NBR, particularly a low-sulfur one. As regards a white reinforcing agent, such as silica or calcium carbonate, it is generally preferable not to add anything, except to any rubber composition having a special purpose, such as the rubber composition (8) according to the sixth aspect of this invention, in view of any undesirable effect that it may have on the fuel impermeability, low temperature properties, conductivity, etc. of the rubber composition, and if anything is added, it is preferable to add only up to 10 parts by weight relative to 100 parts by weight of NBR or NBR-PVC.

2. Rubber Composition According to the Second Aspect:

The rubber composition according to the second aspect of this invention is a rubber composition used for a fuel transporting hose for a vehicle, comprising NBR having an AN content of 46 to 52 percent by weight and blended with less than 25 percent by weight of PVC as a base material and 15 to 30 parts by weight of a plasticizer having an SP value of 8.8 or more and a molecular weight of 550 or less, relative to 100 parts by weight of the base material. Because of its low weatherability and ozone resistance, though it is better than the rubber composition according to the first aspect, it is unsuitable as a material for an outer wall layer of a fuel hose having a multilayer wall structure, or as a material for a fuel hose having a single-layer wall, and is suitable for use as a material for an inner wall layer of a fuel hose having a multilayer wall structure.

It is preferable for the rubber composition that NBR have an AN content of 48 to 52 percent, and that the plasticizer have an SP value of 9.0 or more, a molecular weight of 450 or less and a proportion of 20 to 25 parts by weight relative to 100 parts by weight of NBR, as has been the case with the rubber composition according to the first aspect of this invention, while the use of the same kind of plasticizer is also preferred.

It is preferable for the rubber composition to have a volume specific resistance not exceeding $10^8 \Omega \cdot cm$ by the addition of CB and a hardness of 55 to 75 degrees (as measured by a JIS K6253 (ISO 48) durometer, type A) by the well-balanced addition of plasticizer and CB, as has been the case with the rubber composition according to the first aspect of this invention, while the kind and amount of CB are also preferred. Moreover, the statements made before in connection with the addition of various known additives and the kinds and addition of vulcanizing and white reinforcing agents for the rubber composition according to the first aspect of this invention are also applicable to the rubber composition according to the second aspect thereof.

3. Rubber Composition (7) According to the Sixth Aspect:

The rubber composition (7) according to the sixth aspect of this invention is a rubber composition used for an inner wall layer of a fuel transporting hose for a vehicle, comprising NBR having an AN content of 48 to 52 percent by weight or such NBR blended with less than 5 percent by weight of PVC as a base material, and 15 to 25 parts by weight of a plasticizer having an SP value of 8.8 or more and a molecular weight of 550 or less, relative to 100 parts by weight of the base material.

The rubber composition differs from the rubber composition according to the first or second aspect of this invention in that NBR has an AN content shifted to a still ultrahigh range of 48 to 52 percent by weight, and that if any PVC is blended, it has a proportion of less than 5 percent by weight, and though it may be improved in fuel impermeability, while remaining relatively the same in low temperature properties, it is inferior to the rubber composition according to the second aspect of this invention in weatherability and ozone resistance, and is also suitable for use as a material for an inner wall layer of a fuel hose having a multilayer wall structure.

The rubber composition is remarkably improved in fuel impermeability if its NBR has an AN content of 50 to 52 percent and/or the plasticizer has a proportion of 18 to 23 parts by weight relative to 100 parts by weight of the base material, and for the same reason as stated for the rubber composition according to the first aspect of this invention, it is preferable that the plasticizer has an SP value of 9.0 or more and a molecular weight of 450 or less. The plasticizer preferred for the rubber composition according to the first aspect is also preferred.

It is preferable for the rubber composition to have a volume specific resistance not exceeding $10^8 \Omega \cdot cm$ by the addition of CB and a hardness of 55 to 75 degrees (as measured by a JIS K6253 (ISO 48) durometer, type A) by the well-balanced addition of plasticizer and CB, as has been the case with the rubber composition according to the first aspect of this invention. Moreover, also applicable are the statements made before in connection with the preferred kind and amount of CB, the addition of various known additives and the kinds and addition of vulcanizing and white reinforcing agents for the rubber composition according to the first aspect of this invention.

4. Rubber Composition (8) According to the Sixth Aspect:

The rubber composition (8) according to the sixth aspect of this invention is a rubber composition used for an outer wall layer of a fuel transporting hose for a vehicle, comprising a blended base material obtained by blending 25 to 40 percent by weight of PVC with NBR having an AN content of 43 to 50 percent by weight, and 15 to 35 parts by weight of a plasticizer having an SP value of 8.8 or more and a molecular weight of 550 or less, relative to 100 parts by weight of the base material.

The rubber composition differs from the rubber composition according to the first or second aspect of this invention in that NBR has an AN content shifted to a somewhat lower range of 43 to 50 percent by weight, while PVC has a higher proportion of 25 to 40 percent by weight, and that the plasticizer also has a somewhat higher proportion, and though it may be relatively difficult to maintain a good balance between its fuel impermeability and low temperature properties, it is of good fuel impermeability owing to the high proportion of PVC and of high weatherability and ozone resistance owing to PVC. Therefore, it is suitable as a material for an outer wall layer of a fuel hose having a multilayer wall structure, or for a fuel hose having a single wall layer.

For the same reason as stated for the rubber composition according to the first aspect of this invention, it is preferable that the plasticizer has an SP value of 9.0 or more and a molecular weight of 450 or less. The plasticizer preferred for the rubber composition according to the first aspect is also preferred.

It is preferable for the rubber composition to have a hardness of 55 to 75 degrees (as measured by a JIS K6253 (ISO 48) durometer, type A) as has been the case with the rubber composition according to the first aspect of this invention. Almost equally applicable are the statements made before in connection with the preferred kind and amount of CB, the addition of various known additives and the kinds and addition of vulcanizing and white reinforcing agents for the rubber composition according to the first aspect of this invention.

Rubber Material for the Outer Wall Layer of the Hose According to the Fifth or Ninth Aspect of the Invention:

The rubber material forming the outer wall layer of the hose according to the fifth aspect of this invention is a certain rubber material of high weatherability or ozone resistance, and specific examples include ECO (epichlorohydrin rubber), CSM (chlorosulfonated polyethylene rubber), NBR-PVC, NE (NBR-EPDM, or a blend of NBR and an ethylene-propylene-diene terpolymer), etc. It may also be a blend composed mainly of any of those materials, or may contain various kinds of additives, if it is certainly of high weatherability or ozone resistance.

The rubber material forming the outer wall layer of the hose according to the ninth aspect of this invention is a certain rubber material of high ozone resistance and cure flatting resistance, and is a material (or mixture) having a sufficiently high viscosity to support its own weight at a high temperature for cure and a sufficiently high vulcanizing speed to overcome any flatting under: heat during cure to remain in shape, a specific example being possibly a mixture containing a large amount of a thickening agent, such as silica.

Fuel Transporting Hoses for Vehicles:

The fuel transporting hose for a vehicle according to the fifth aspect of this invention is a hose having an inner wall layer formed from the rubber composition according to any of the first to fourth aspects thereof and an outer wall layer formed from a certain rubber material of high weatherability or ozone resistance as stated before; the fuel transporting hose according to the sixth aspect of this invention is a hose having an inner wall layer formed from the rubber composition (7) and an outer wall layer formed from the rubber composition (8) as described before; and the fuel transporting hose according to the ninth aspect of this invention is a hose having an inner wall layer formed from the rubber composition (7) and an outer wall layer formed from a certain rubber material of high ozone resistance and cure flatting resistance as stated before. The thicknesses of the inner and outer wall layers of each such hose may be selected appropriately in accordance with the total wall thickness of the hose, the fuel impermeability as required and other properties of the hose, but the inner wall layer preferably has a thickness equal to at least a half of the total wall thickness of the hose.

Each fuel transporting hose may contain any element for forming a hose, such as an intermediate reinforcing yarn layer, if required in addition to the inner and outer wall layers. However, the hose preferably has its innermost wall layer formed by the inner wall layer as described above. In the event that a reinforcing yarn layer is formed, there is no limitation as to the kind of reinforcing yarn or the formation of the layer (braiding, spiral winding in one or more layers, the presence of an intermediate rubber layer, etc.). All of the hoses can be used without limitation for various purposes as fuel transporting hoses for vehicles, and are particularly suitable for use as filler neck hoses, or breather or evaporation hoses in vapor lines, and the hose according to the ninth aspect of this invention is, among others, suitable as a hose having a relatively large diameter, e.g. a breather hose, in the event that efficient pan cure with no mandrel is desired.

Process for Manufacturing a Fuel Transporting Hose for a Vehicle:

The fuel transporting hoses for vehicles as described can be manufactured by any known method. The hose according to the ninth aspect of this invention can be made with a considerably large diameter by extrusion, and pan cured directly. The other hoses are, however, likely to be flatted easily in their molded form yet to be cured, and the following manufacturing processes can, for example, be relied upon as suitable countermeasures.

Firstly, an uncured molded product for a straight or curved hose having a single-layer or multilayer wall structure is extruded in a straight form, and cured by heating, while its straight or curved tubular shape is maintained by a straight or curved mandrel inserted through it, or by a heating die having the molded product fitted in its straight or curved groove. This process is suitable for making, among others, a breather hose.

Secondly, a straight, curved or at least partly corrugated tubular cavity is formed in a mold containing a mandrel and capable of being heated and an uncured rubber material is introduced into the cavity and cured by the heat of the heated mold to make a straight, curved or at least partly corrugated hose. The hose removed from the mold after curing may be further heated by any appropriate method for accelerated curing. This process is suitable for making, among others, a filler hose.

BEST MODE OF CARRYING OUT THE INVENTION:

Formulations for Uncured Rubber Compositions:

Referring first to Comparative Example 1, there was employed a fluororubber (FKM) composition prepared by mixing 100 parts by weight of Fluorel FE5731Q (tradename) of Sumitomo 3M, which was FKM having a fluorine content of 69 percent and containing an internal polyol vulcanizing agent, 3 parts by weight of MgO, 6 parts by weight of $Ca(OH)_2$ and 15 parts by weight of CB.

Then, formulations were established to prepare test specimens of rubber compositions according to Examples 1 to 10 as shown in Tables 1 and 2, Comparative examples 2 to 11 as shown in Tables 3 and 4, and Examples 2–1 and 2–2 and Comparative examples 2–1 and 2–2 as shown in Table 5 in accordance with the basic formulation as shown below and by adding a white reinforcing agent in certain cases as shown in the relevant tables.

TABLE 1

|  | 1 | 2 | 3 | 4 | 5 | 6 | 7 | 8 |
|---|---|---|---|---|---|---|---|---|
| AN content | 50 | 52 | 46 | 46 | 46 | 50 | 50 | 50 |
| Amount of PVC | 0 | 0 | 0 | 15 | 25 | 0 | 0 | 0 |
| Molecular weight of plasticizer | 434 | 434 | 434 | 434 | 434 | 550 | 434 | 434 |
| SP value of plasticizer | 9.2 | 9.2 | 9.2 | 9.2 | 9.2 | 8.9 | 9.2 | 9.2 |
| Amount of plasticizer (phr) | 23 | 23 | 23 | 23 | 23 | 23 | 15 | 30 |
| Carbon grade | FEF | FEF | FEF | FEF | FEF | FEF | HAF | FEF |
| Amount of carbon (phr) | 40 | 40 | 40 | 40 | 40 | 40 | 30 | 50 |
| Conductive carbon | — | — | — | — | — | — | — | — |
| Amount of conductive carbon (phr) | — | — | — | — | — | — | — | — |
| White reinforcing agent | — | — | — | — | — | — | — | — |
| Amount of white reinforcing agent | — | — | — | — | — | — | — | — |
| Physical properties in ordinary state |  |  |  |  |  |  |  |  |
| Tensile strength (MPa) | 15.5 | 11.7 | 14.7 | 16.6 | 16.3 | 15.0 | 17.8 | 13.9 |
| Elongation (%) | 570 | 390 | 650 | 560 | 510 | 590 | 520 | 490 |
| Hardness (HA) | 62 | 65 | 60 | 66 | 70 | 60 | 68 | 61 |
| Gasoline permeability (PHASE II) Permeation coefficient (mg · mm/cm$^2$/day) | 0.7 | 0.4 | 6.0 | 3.8 | 3.0 | 1.1 | 0.5 | 3.8 |
| Brittle temperature (° C.) | −28 | −25 | −34 | −28 | −23 | −23 | −21 | −32 |
| Volume specific resistance (Ω · cm) | $2 \times 10^7$ | $7 \times 10^7$ | $3 \times 10^7$ | $6 \times 10^7$ | $5 \times 10^7$ | $1 \times 10^7$ | $1 \times 10^8$ | $3 \times 10^6$ |
| Bleeding | No | No | No | No | No | No | No | No |
| Workability | Good | Good | Good | Good | Good | Good | Good | Good |

TABLE 2

|  | 9 | 10 |
|---|---|---|
| AN content | 50 | 50 |
| Amount of PVC | 0 | 0 |
| Molecular weight of plasticizer | 434 | 434 |
| SP value of plasticizer | 9.2 | 9.2 |
| Amount of plasticizer (phr) | 23 | 23 |
| Carbon grade | HAF | HAF |
| Amount of carbon (phr) | 25 | 20 |
| Conductive carbon | Ketchen | Ketchen |
| Amount of conductive carbon (phr) | 5 | 5 |
| White reinforcing agent | — | Talc |
| Amount of white reinforcing agent | — | 10 |
| Physical properties in ordinary state |  |  |
| Tensile strength (MPa) | 15.0 | 12.3 |
| Elongation (%) | 380 | 430 |
| Hardness (HA) | 69 | 68 |
| Gasoline permeability (PHASE II) Permeation coefficient (mg · mm/cm$^2$/day) | 1.5 | 1.0 |
| Brittle temperature (° C.) | −23 | −21 |
| Volume specific resistance (Ω · cm) | $1 \times 10^6$ | $5 \times 10^7$ |
| Bleeding | No | No |
| Workability | Good | Good |

TABLE 3

|  | 1 | 2 | 3 | 4 | 5 | 6 | 7 |
|---|---|---|---|---|---|---|---|
| AN content | Ternary FKM containing 69% F | 43.5 | 50 | 50 | 50 | 50 | 50 |
| Amount of PVC |  | 0 | 0 | 0 | 0 | 0 | 0 |
| Molecular weight of plasticizer | — | 434 | 434 | 434 | 371 | 850 | 434 |
| SP value of plasticizer | — | 9.2 | 9.2 | 9.2 | 8.5 | 9.2 | 9.2 |
| Amount of plasticizer (phr) | — | 23 | 10 | 35 | 23 | 23 | 23 |
| Carbon grade | SRF | FEF | HAF | FEF | FEF | FEF | HAF |
| Amount of carbon (phr) | 15 | 40 | 25 | 60 | 40 | 40 | 20 |
| Conductive carbon | — | — | — | — | — | — | — |
| Amount of conductive carbon (phr) | — | — | — | — | — | — | — |
| White reinforcing agent | — | — | — | — | — | — | Silica |
| Amount of white reinforcing agent | — | — | — | — | — | — | 20 |
| Physical properties in ordinary state |  |  |  |  |  |  |  |
| Tensile strength (MPa) | 12.5 | 14.6 | 17.9 | 14.0* | 15.6* | 15.2* | 13.2 |
| Elongation (%) | 350 | 630 | 620 | 560 | 450 | 520 | 480 |

TABLE 3-continued

|  | 1 | 2 | 3 | 4 | 5 | 6 | 7 |
|---|---|---|---|---|---|---|---|
| Hardness (HA) | 70 | 60 | 60 | 63 | 66 | 65 | 67 |
| Gasoline permeability (PHASE II) Permeation coefficient (mg · mm/cm$^2$/day) | 0.7 | 11.4 | 0.4 | 9.5* | 0.9* | 2.6* | 8.9 |
| Brittle temperature (° C.) | −20 | −34 | −17 | −34* | −15* | −18* | −19 |
| Volume specific resistance (Ω · cm) | 1 × 10$^{11}$ | 1 × 10$^8$ | 7 × 10$^8$ | 1 × 10$^{6*}$ | 8 × 10$^{6*}$ | 2 × 10$^{7*}$ | 8 × 10$^9$ |
| Bleeding | No | No | No | Yes | Yes | Yes | No |
| Workability | Good | Good | Good | Bad | Bad | Good* | Good |

*Only for reference due to plasticizer bleeding

TABLE 4

|  | 8 | 9 | 10 | 11 |
|---|---|---|---|---|
| AN content | 50 | 50 | 50 | 50 |
| Amount of PVC | 0 | 0 | 0 | 0 |
| Molecular weight of plasticizer | 434 | 434 | 434 | 434 |
| SP value of plasticizer | 9.2 | 9.2 | 9.2 | 9.2 |
| Amount of plasticizer (phr) | 23 | 23 | 23 | 23 |
| Carbon grade | HAF | HAF | HAF | FT |
| Amount of carbon (phr) | 20 | 20 | 20 | 80 |
| Conductive carbon | — | — | — | — |
| Amount of conductive carbon (phr) | — | — | — | — |
| White reinforcing agent | Calcium carbonate | Mica | Talc | — |
| Amount of white reinforcing agent | 30 | 30 | 30 | — |
| Physical properties in ordinary state |  |  |  |  |
| Tensile strength (MPa) | 12.3 | 10.8 | 12.5 | 10.5 |
| Elongation (%) | 480 | 380 | 390 | 360 |
| Hardness (HA) | 59 | 57 | 62 | 59 |
| Gasoline permeability (PHASE II) Permeation coefficient (mg · mm/cm$^2$/day) | 15.3 | 0.6 | 0.5 | 0.5 |
| Brittle temperature (° C.) | −14 | −14 | −17 | −24 |
| Volume specific resistance (Ω · cm) | 3 × 10$^{10}$ | 1 × 10$^{10}$ | 2 × 10$^{10}$ | 4 × 10$^9$ |
| Bleeding | No | No | No | No |
| Workability | Good | Bad | Good | Good |

TABLE 5

|  | Example 2-1 | Example 2-2 | Comparative Example 2-1 | Comparative Example 2-2 |
|---|---|---|---|---|
| Polymer | NBR-PVC | NBR-PVC | NBR-PVC | NBR-PVC |
| AN content | 46 | 40 | 46 | 35 |
| Amount of PVC | 30 | 30 | 30 | 30 |
| Molecular weight of plasticizer | 434 | 391 | 434 | 391 |
| SP value of plasticizer | 9.2 | 9.0 | 9.2 | 9.0 |
| Amount of plasticizer (phr) | 25 | 25 | 35 | 30 |
| Carbon grade | FEF | SRF | FEF | FEF |
| Amount of carbon (phr) | 10 | 10 | 55 | 65 |
| White reinforcing agent | Silica | Silica | — | — |
| Amount of white reinforcing agent | 40 | 40 | — | — |
| Physical properties in ordinary state |  |  |  |  |
| Tensile strength (MPa) | 14.8 | 17.7 | 14.2 | 14.5 |
| Elongation (%) | 450 | 500 | 550 | 510 |
| Hardness (HA) | 73 | 70 | 69 | 68 |
| Gasoline permeability (PHASE II) Permeation coefficient (mg · mm/cm$^2$/day) | 18.7 | 50.5 | 9.1 | 80.5 |
| Cure flatting resistance | Good | Good | Bad | Bad |
| Bleeding | No | No | No | No |
| Workability | Good | Good | Good | Good |

Tables 1 to 4 show the formulations for Examples and Comparative Examples each intended for a material for the inner wall layer of a fuel hose for a vehicle and Table 5 shows the formulations for Examples and Comparative Examples each intended for the rubber composition (8) according to the sixth aspect of this invention or the rubber material for the outer wall layer according to the ninth aspect of this invention.

Basic Formulation

Polymer—100 parts by weight

Zinc oxide—5 parts by weight

Stearic acid—1 part by weight

Antioxidant—2 parts by weight

Carbon black (CB)—Variable

Plasticizer—Variable

Sulfur—0.5 part by weight

Thiuram vulcanization accelerator—1.5 parts by weight

Sulfenamide vulcanization accelerator—1.5 parts by weight

The polymer in the basic formulation is NBR or NBR-PVC having a different PVC proportion and a different AN content in NBR as shown in each table. In the tables, the AN content and the PVC proportion are both shown by weight percentage.

ADEKA CIZER RS107 (tradename) of Asahi Denka Kogyo K.K. was employed as the plasticizer in each of Examples 1 to 5 and 7 to 10, Comparative Examples 2 to 4 and 7 to 11, Example 2-1 and Comparative Example 2-1, ADEKA CIZER RS700 (tradename) of Asahi Denka Kogyo K.K. in Example 6, DOA in Comparative Example 5, ADEKA CIZER RS735 (tradename) of Asahi Denka Kogyo K.K. in Comparative Example 6, and DOP in Example 2—2 and Comparative Example 2—2, all used in the amount shown by phr (parts per hundred parts of rubber: parts by weight relative to 100 parts by weight of polymer). The SP value and molecular weight of the plasticizer are also shown in each table.

Each table shows the carbon black employed as Carbon grade, i.e. Show Black N330 (tradename) of Showa Cabot K.K. as HAF, Seast SO (tradename) of Tokai Carbon Co., Ltd. as FEF, Seast S (tradename) of Tokai Carbon Co., Ltd. as SRF and Asahi Thermal (tradename) of Asahi Carbon Co., Ltd. as FT, together with its amount shown by phr.

In some Examples or Comparative Examples, Ketchen Black (Ketchen Black EC (tradename) of Ketchen International Co.) was used as conductive carbon instead of CB or in addition to it as shown by phr in the tables.

In certain Examples and Comparative Examples, a white reinforcing agent of the type shown in each relevant table was used in the amount shown by phr. The tables show NIPSIL ER (tradename) of Nippon Silica K.K. as Silica, Hakuenka CC (tradename) of Shiraishi Calcium Kaisha, Ltd. as Calci-um carbonate, Canna Mica M-200 (tradename) of KMG Minerals, Inc. as Mica and Mistron Vapor (tradename) of Sierra Talc Co. as Talc.

Ozonon 3C (tradename) or NONFLEX RD (tradename) of Seiko Chemical Co., Ltd. was used as the antioxidant, Nocceler TT-G or Nocceler CZ-G (tradename) of Ouchi Shinko Chemical Industrial Co., Ltd. as the vulcanization accelerator, and sulfur PTC as the vulcanizing agent.

Preparation of Test Specimens:

The uncured rubber composition according to each example was prepared by mixing in a Banbury mixer and open rolls in accordance with the relevant formulation, and press cured at 150° C. for 30 minutes (160° C. for 45 minutes in Comparative Example 1) to form a sheet having a thickness of 2 mm to prepare a test specimen in sheet form.

Evaluation for Physical Properties in Ordinary State:

The test specimens according to each example were tested for tensile strength (MPa), elongation (%) and hardness (HA as measured by a type A durometer) as physical properties in an ordinary state in accordance with JIS K6251. (ISO 37) and JIS K6253 (ISO 48). The results are shown in Tables 1 to 5. A tensile strength of 10.0 MPa or more, an elongation of 300% or more and a hardness (HA) of 55 to 75 degrees are considered as the preferred physical properties.

Evaluation for Gasoline Permeability:

The evaluation of the test specimen according to each example for its gasoline permeability was made by measuring its permeation coefficient (mg·mm/cm$^2$/day) in accordance with the CUP method using PHASE II gasoline as stated before. The CUP method is carried out by placing gasoline in a specific cup-shaped device, closing the opening of the cup (having an open area of P cm$^2$) tightly with the test specimen in the form of a sheet having a thickness of t (mm) and turning the whole device upside down to dip one side of the specimen in the gasoline.

More particularly, pretreatment is carried out by placing 100 ml of gasoline in the cup, leaving one side of the specimen dipped in the gasoline at 40° C. for seven days, changing the gasoline to 100 ml of new gasoline and measuring the total weight W0 (mg) including the cup. Then, the specimen has one side thereof left dipped in the gasoline at 40° C. for three days, the total weight W1 (mg) including the cup is measured immediately thereafter, and the permeation coefficient is calculated in accordance with an equation: Permeation coefficient=t(W0−W1)/3P.

The permeation coefficient as calculated is shown in each relevant table. A permeation coefficient of 10.0 or less is preferred, and a still higher level of impermeability (e.g. a coefficient of 3.0 or less) is considered preferable for the rubber composition (7) according to the sixth or seventh aspect of this invention of which a higher level of impermeability is required.

Evaluation for Low Temperature Properties:

The brittle temperature (° C.) of the test specimen according to each of the examples shown in Tables 1 to 4 was measured by a low temperature impact test as specified by JIS K6261 (ISO 812). The results are shown in Tables 1 to 4. A brittle temperature of −20° C. or below is considered preferable.

Evaluation for Volume Specific Resistance:

The volume specific resistance (ohms cm) of the test specimen according to each of the examples shown in Tables 1 to 4 was determined by a test using a voltage of 1 to 100 V in accordance with JIS K6911 (IEC 93). The results are shown in Tables 1 to 4. A volume specific resistance not exceeding $10^8 \Omega \cdot cm$ is considered preferable.

Evaluation for Cure Flatting Resistance:

A truly circular hose having a single-layer wall with an inside diameter of 13 mm and an outside diameter of 21 mm was extruded from the uncured rubber composition according to each of the examples shown in Table 5, and after 30 minutes of curing at 150° C. in a steam cure oven, its cross-sectional height was compared with what it had been before its curing. A difference of 5% or less is desirable, and the composition which conformed to that standard is shown as Good in the table, and that which did not is shown as Bad.

Evaluation for Other Items:

The test specimen according to each of the examples shown in Tables 1 to 4 was examined for any bleeding on the sheet surface after it had been left to stand at normal temperature for a week after curing. If no bleeding was found, it is shown as No in the relevant table, and if any bleeding was found, it is shown as Yes.

An overall evaluation of the test specimen according to each of the examples shown in Tables 1 to 5 for workability by examining its Banbury and roll workability, and extrusion processability. The workability of each composition is shown as Good if there was no problem, and as Bad if there was any problem.

INDUSTRIAL UTILITY

As is obvious from the foregoing, the rubber composition of this invention is a simple mixture of inexpensive constituents which can realize a high level of fuel impermeability, while ensuring other properties, such as low temperature properties. The conductivity as required of certain fuel transporting hoses for vehicles is also easy to satisfy. The fuel transporting hose of this invention formed from any such rubber composition is easy to manufacture at a low cost and yet can realize a high level of fuel impermeability, and good conductivity if desired.

What is claimed is:

1. A rubber composition useful for a fuel transporting hose for a vehicle, comprising a) NBR having an AN content of from 46 to 52 percent by weight as a base material and b) from 15 to 30 parts by weight of a plasticizer having an SP value of 8.8 or more and a molecular weight of 550 or less, relative to 100 parts by weight of the base material.

2. The rubber composition according to claim 1, which satisfies at least one of the following (1) to (4):
   (1) the NBR has an AN content of 48 to 52 percent by weight;
   (2) the plasticizer has an SP value of 9.0 or more;
   (3) the plasticizer has a molecular weight of 450 or less; and (4) the plasticizer has a proportion of from 20 to 25 parts by weight relative to 100 parts by weight of the base material.

3. The rubber composition according to claim 1, which satisfies the following (5) and/or (6):

(5) it has a volume specific resistance not exceeding $10^8 \Omega \cdot cm$; and (6) it has a hardness of from 55 to 75 degrees as measured by a JIS K6253 (ISO 48) durometer, type A.

4. A rubber composition for a fuel transporting hose for a vehicle, comprising: a) a blended base material which is a blend of NBR having an AN content of from 46 to 52 percent by weight and less than 25 percent by weight of PVC, and b) from 15 to 30 parts by weight of a plasticizer having an SP value of 8.8 or more and a molecular weight of 550 or less, relative to 100 parts by weight of the base material.

5. The rubber composition according to claim 4, which satisfies at least one of the following (1) to (4):

(1) the NBR has an AN content of 48 to 52 percent by weight;

(2) the plasticizer has an SP value of 9.0 or more;

(3) the plasticizer has a molecular weight of 450 or less; and (4) the plasticizer has a proportion of from 20 to 25 parts by weight relative to 100 parts by weight of the base material.

6. The rubber composition according to claim 4, which satisfies the following (5) and/or (6):

(5) it has a volume specific resistance not exceeding $10^8 \Omega \cdot cm$; and (6) it has a hardness of from 55 to 75 degrees as measured by a JIS K6253 (ISO 48) durometer, type A.

7. A fuel transporting hose for a vehicle comprising an inner wall layer of the rubber composition according to claim 1 and an outer wall layer of a rubber material of high weatherability and ozone resistance.

8. The hose according to claim 7, further comprising a reinforcing yarn layer formed between the inner and outer wall layers.

9. A fuel transporting hose for a vehicle comprising an inner wall layer of a rubber composition (7) and an outer wall layer of a rubber composition (8):

(7) a rubber composition comprising NBR having an AN content of from 48 to 52 percent by weight, or a blend of such NBR and less than 5 percent by weight of PVC as a base material and from 15 to 25 parts by weight of a plasticizer having an SP value of 8.8 or more and a molecular weight of 550 or less, relative to 100 parts by weight of the base material; and (8) a rubber composition comprising a blended base material, which is a blend of NBR having an AN content of from 43 to 50 percent by weight and from 25 to 40 percent by weight of PVC, and from 15 to 35 parts by weight of a plasticizer having an SP value of 8.8 or more and a molecular weight of 550 or less, relative to 100 parts by weight of the base material.

10. The hose according to claim 9, further comprising a reinforcing yarn layer formed between the inner and outer wall layers.

11. The hose according to claim 9, wherein the rubber composition (7) satisfies at least one of the following (9) to (12):

(9) the NBR has an AN content of from 50 to 52 percent by weight;

(10) the plasticizer has an SP value of 9.0 or more;

(11) the plasticizer has a molecular weight of 450 or less; and

(12) the plasticizer has a proportion of from 18 to 23 parts by weight relative to 100 parts by weight of the base material.

12. The hose according to claim 9, wherein the rubber composition (8) satisfies one or both of the following (10) and (11):

(10) the plasticizer has an SP value of 9.0 or more; and

(11) the plasticizer has a molecular weight of 450 or less.

13. The hose according to claim 9, wherein the rubber composition (7) and/or (8) satisfies the following (13) and/or (14):

(13) it has a volume specific resistance not exceeding $10^8 \Omega \cdot cm$; and

(14) it has a hardness of from 55 to 75 degrees as measured by a JIS K6253 (ISO 48) durometer, type A.

14. A fuel transporting hose for a vehicle comprising an inner wall layer of the rubber composition (7) according to claim 9 and an outer wall layer of a rubber material of high weatherability, ozone resistance and cure flatting resistance.

15. The hose according to claim 14, further comprising a reinforcing yarn layer between the inner and outer wall layers.

* * * * *